UNITED STATES PATENT OFFICE.

JAMES MILLAR NEIL, OF TORONTO, ONTARIO, CANADA, ASSIGNOR TO ALEXANDER M. HAY, OF TORONTO, CANADA.

PROCESS OF OBTAINING POTASH FROM FELDSPAR.

1,034,281.  Specification of Letters Patent.  Patented July 30, 1912.

No Drawing.  Application filed October 17, 1911.  Serial No. 655,213.

*To all whom it may concern:*

Be it known that I, JAMES M. NEIL, of Toronto, in the county of York, Province of Ontario, Canada, have invented certain new and useful Improvements in Processes of Obtaining Potash from Feldspar; and I hereby declare that the following is a full, clear, and exact description thereof.

This invention is a novel process or method of treating feldspar, leucite, and other minerals containing potash, to obtain the potash therefrom for commercial uses; and also the alumina and silica therein.

The process in brief consists essentially in (1) fusing the crude feldspar, leucite or other mineral containing potash; (2) converting the constituents of the fused mineral into their relative soluble and insoluble compounds; (3) dissolving such soluble compounds; (4) separating the insoluble compounds from the soluble compounds; (5) precipitating the alumina and iron in the remaining solution; (6) separating the alumina and iron precipitates from the solution; (7) recovering the ammonia in the solution; (8) separating the calcium from the remaining solution; and (9) evaporating the residual liquor to obtain the potash therein.

The process is particularly suitable for treating feldspar and leucite, and I will describe the invention as employed in operating thereon to recover the potash therein; but the process is applicable to other minerals containing potash, and I do not consider it restricted to feldspar or leucite alone. Feldspar contains approximately from 3% to 16% of potash; 5% to 27% of alumina; 50% to 70% of silica; and varying small percentages of lime, magnesia, soda, iron, etc.

In the practical operation of the invention crude feldspar is reduced by crushing or grinding machines after which it is fused in a suitable furnace. On account of the excessively high fusing point of crude feldspar it has heretofore been considered commercially impracticable to fuse the same; but I have discovered that the fusing point of feldspar can be lowered to a practical working point, by the use of a sulfate or bi-sulfate of an alkali metal, and this discovery is an important feature of my process. In utilizing this discovery I preferably place in a suitable furnace a quantity of a sulfate or bi-sulfate of an alkali metal and bring same to a state of fusion; then I gradually add crude crushed feldspar, which is brought into a state of fusion at a much lower temperature than the normal fusing point of feldspar when treated alone.

The amount of the sulfate or bi-sulfate of an alkali metal required will vary according to the physical composition of the feldspar, but from 10% to 25% of such sulfate or bi-sulfate would ordinarily be sufficient for use in connection with common feldspar. I do not however restrict myself to the proportions named, because as stated these will be varied according to the physical composition of the mineral being treated and the amount of material which the furnace is designed to handle. After the operation of fusing has been commenced it can be carried on continuously, if desired, by adding as required sufficient of the sulfate or bi-sulfate of an alkali metal to the furnace with the feldspar to maintain the fusing point at the desired temperature. When a sulfate of an alkali metal is used in the initial step of the process I may subject the molten mass to the action of a gaseous sulfur compound containing oxygen, such as sulfur dioxid gas, in order to reduce the potash and alumina therein to their respective sulfates and sulfites. The said gas may be passed through the molten mass until the potash, alumina, etc., have been converted into their relative sulfates and sulfites. The chemical reactions may be greatly accelerated by also subjecting the molten mass to the action of oxygen (in the form of steam, or air, or both) which is preferably passed through the molten mass along with the sulfur dioxid gas. I prefer to superheat the steam and air before passing them through the molten mass. The sulfur dioxid combines with the oxid of potassium and oxid of alumina, etc., present in the crude fused feldspar thereby forming sulfites of the respective elements; and these sulfites are then converted into sulfates by combining with the oxygen in the steam or air. Instead of passing the gases through the molten mass as aforesaid, the latter may be agitated in an atmosphere containing sulfur dioxid ($SO_2$) and oxygen, (steam or air) in cases where revolving furnaces are employed. Instead of subjecting the molten mass, when the feldspar is fluxed by means of potassium sulfate or bi-sulfate, to the action of sulfur dioxid and gases containing oxygen, I preferably subject the molten feldspar to the action of sulfur-tri-oxid gas until all the potash, alumina, etc., have been converted into their corresponding sulfates. The sulfur-tri-oxid gas may be introduced into the molten mass in the manner suggested for the treatment thereof by the sulfur dioxid; or in any other suitable method. A combination of a sulfate and bi-sulfate of alkali metals may be used to reduce the fusion point of the feldspar, the action of such sulfate and such bi-sulfate being that of a solvent for the feldspar.

After the molten mineral has been converted into a mass of soluble and insoluble compounds as above described, the soluble compounds may be separated from the insoluble compounds in any suitable manner. A preferable and economical manner of doing so is to pour the mass of molten mineral into a tank or receptacle containing water. When such molten mass is discharged into the water the soluble compounds are dissolved, while the silica and other insoluble matters remain in suspension in the solution. I then separate the silica and insoluble compounds from the solution by decantation or preferably by filtration. The insoluble compounds after being separated from the soluble compounds will be found to consist almost entirely of silica in a fine state of subdivision, and in such a condition that it can be usefully employed in the arts. The liquor containing the soluble compounds is then treated by any well known method in order to precipitate the alumina and iron. I may effect such precipitation by adding to the solution an alkali hydrate, preferably ammonium hydrate, but I prefer to pass ammonia gas through the liquor in sufficient quantity to precipitate all of the alumina and iron therein. The precipitated alumina and iron is then separated by decantation, or filtration from the liquor, which now contains ammonia as well as sulfate of potash, with traces of magnesia and soda, varying according to the constituents of the original mineral being treated. I now add to the liquor sufficient milk of lime to liberate the ammonia, which may be done in any of the well known apparatus used in the arts for such purposes. After liberating the ammonia the remaining liquor contains calcium sulfate in suspension and potash, magnesia and soda sulfates in solution. The calcium sulfate is separated from such liquor by decantation, or, preferably by filtration. After separation of the calcium sulfate the residual liquor is tested to ascertain if it contains any sulfites or sulfur compounds lower than sulfates. If any such should be found therein the liquor may be further treated with an oxidizing re-agent to convert such lower sulfur compounds into their respective sulfate compounds. If no such lower sulfur compounds be found in the residual liquor, or after the same have been converted into sulfates as above described, the liquor is finally evaporated and the sulfate of potash recovered.

By this process practically all of the potash contained in the original feldspar or other mineral is recovered. Such potash may contain more or less traces of magnesia, soda and other soluble impurities which were contained in the original mineral. Such impurities may however be separated from the potash by further treatment; but unless they are present in sufficient quantities to affect the commercial value of the potash, it is unnecessary to do so.

What I claim is:

1. The process of obtaining potash from minerals, consisting in fusing a sulfate of an alkali metal; adding thereto a mineral containing potash and melting same.

2. The process of treating minerals containing potash to obtain the valuable constituents thereof; consisting in melting the mineral together with a sulfate of an alkali metal; and subjecting the molten mass in the presence of steam or air to the action of a gaseous sulfur compound containing oxygen.

3. The process of obtaining potash from minerals, consisting in fusing a sulfate of an alkali metal; adding thereto a mineral containing potash and melting same; and subjecting the molten mass in the presence of steam or air to the action of a gaseous sulfur compound containing oxygen.

4. The process of treating minerals containing potash to reduce the valuable constituents thereof to sulfates; consisting in melting the minerals in the presence of a sulfate of an alkali metal; subjecting the molten mass in the presence of steam or air to the action of a gaseous sulfur compound containing oxygen; and subsequently separating the soluble from the insoluble matters.

5. The process of treating minerals containing potash, consisting in subjecting the minerals mixed with sulfate of potash to sufficient heat to melt the mass; subjecting the molten mass to the action of a gaseous sulfur compound containing oxygen in the presence of steam or air; and subjecting such molten mass to water to separate the soluble and insoluble compounds.

6. The process of obtaining potash from minerals, consisting in fusing a sulfate of an alkali metal; adding thereto a mineral containing potash and melting same; subjecting the molten mass in the presence of steam or air to the action of a gaseous sulfur compound containing oxygen; and subsequently separating the soluble from the insoluble matters and recovering the potash from the soluble matters.

7. The process of obtaining potash from minerals, consisting in fusing a sulfate of an alkali metal; adding thereto a mineral containing potash and melting same; subjecting the molten mass in the presence of steam or air to the action of a gaseous sulfur compound containing oxygen; discharging the molten mass thus treated into water; and subsequently separating the soluble from the insoluble compound and recovering the potash from the soluble compound.

8. The herein described process of treating feldspar and other minerals containing potash, consisting in fusing the minerals; converting the soluble components of the fused minerals into sulfates; dissolving the soluble compounds; separating the insoluble compounds from the soluble compounds; separating the alumina and iron from the soluble compounds by means of ammonia; separating the ammonia from the solution by means of calcium hydrate; separating the calcium components from the solution; and finally evaporating the residual liquor to obtain the potash.

9. The process of obtaining potash from feldspar and other minerals containing potash, consisting in fusing the crude minerals mixed with a sulfate of an alkali metal; converting the fused mass into its several soluble and insoluble compounds; dissolving the soluble compounds by discharging the molten mass into water; separating the insoluble compounds from the solution; precipitating and separating the alumina and iron from the remaining solution of soluble compounds; and finally recovering the potash from the residual liquor.

10. The process of obtaining potash from feldspar and other minerals containing potash, consisting in fusing the minerals mixed with a sulfate of an alkali metal; converting the fused mass into its soluble and insoluble compounds; discharging the molten mass into water to dissolve the soluble compounds; separating the insoluble compounds from the solution; precipitating the alumina and iron in the remaining solution by means of ammonia; and separating the precipitates therefrom, and separating the potash from the solution.

11. The process of obtaining potash from feldspar and other minerals containing potash, consisting in fusing the crude minerals mixed with a sulfate of an alkali metal; converting the fused mass into its several soluble and insoluble compounds; dissolving the soluble compounds by discharging the molten mass into water; separating the insoluble compounds; precipitating the alumina and iron in the remaining solution by means of ammonia; separating the precipitates from the solution; recovering the ammonia in the solution by means of lime; separating the calcium from the solution; and finally evaporating the residual liquor to obtain potash.

12. The process of obtaining potash from feldspar and other minerals containing potash, consisting in fusing the crude minerals mixed with an alkaline substance containing sulfur; converting the fused mass into its several soluble and insoluble compounds by subjecting same to the action of sulfur-tri-oxid; dissolving the soluble compounds; separating the insoluble compounds from the solution, and recovering the potash from the residual liquor.

13. The process of obtaining potash from feldspar and other minerals containing potash, consisting in fusing the crude minerals mixed with an alkaline substance containing sulfur; converting the fused mass into its several soluble and insoluble compounds by subjecting the fused mass to the action of sulfur-tri-oxid; dissolving the soluble compounds by discharging the molten mass into water; separating the insoluble compounds from the solution; precipitating the alumina and iron contained in the solution, separating the precipitates from the solution, and finally recovering the potash from the residual liquor.

14. The process of obtaining potash from feldspar and other minerals containing potash, consisting in fusing the crude minerals mixed with an alkaline substance containing sulfur; converting the fused mass into its several soluble and insoluble compounds by subjecting the fused mass to the action of sulfur-tri-oxid; dissolving the soluble compounds by discharging the molten mass into water; separating the insoluble compounds from the solution; precipitating the alumina and iron contained in the solution by means of ammonia; separating the precipitates from the solution; recovering the ammonia in the solution by means of lime; separating the calcium from the solution; and finally evaporating the residual liquor to obtain potash.

In testimony that I claim the foregoing as my own, I affix my signature in presence of two witnesses.

JAMES MILLAR NEIL.

Witnesses:
 JOHN H. SIGGERS,
 ARTHUR E. DOWELL.